United States Patent [19]

Baumann et al.

[11] 4,355,124

[45] Oct. 19, 1982

[54] AIR- AND/OR OVEN-DRYING LUBRICANT PAINT COMPOSITION FOR PRODUCING DRY-FILM LUBRICANTS

[75] Inventors: Gilbert Baumann, Noice Le Roy, France; Paul Deyber, Munich, Fed. Rep. of Germany; Wilhelm Huber, Landshut, Fed. Rep. of Germany; Werner Läpple, Karlsfeld, Fed. Rep. of Germany; Horst Trautmann, Geretsried, Fed. Rep. of Germany

[73] Assignee: Dow Corning GmbH, Munich, Fed. Rep. of Germany

[21] Appl. No.: 256,456

[22] Filed: Apr. 22, 1981

[30] Foreign Application Priority Data

May 16, 1980 [DE] Fed. Rep. of Germany ....... 3018873

[51] Int. Cl.³ .............................................. C08K 5/34
[52] U.S. Cl. .................... 524/104; 524/173; 524/205; 524/233; 524/462; 524/487
[58] Field of Search ............. 260/28 R; 524/104, 173, 524/205, 233, 462, 487

[56] References Cited

U.S. PATENT DOCUMENTS 3,882,128 5/1975 McLaren et al. .............. 260/28.5 R

*Primary Examiner*—Melvyn I. Marquis
*Attorney, Agent, or Firm*—George A. Grindahl

[57] ABSTRACT

Air- and/or oven-drying lubricant paint compositions are disclosed which are useful for providing dry-film lubrication for substrates. The compositions comprise a binder resin dissolved in an organic solvent, optionally containing an extender, and further containing a polyalkylene wax which may be modified or unmodified. The dry-film lubricant provides a coefficient of friction which is lower, more uniform and of a narrower range than the compositions of the art.

17 Claims, 1 Drawing Figure

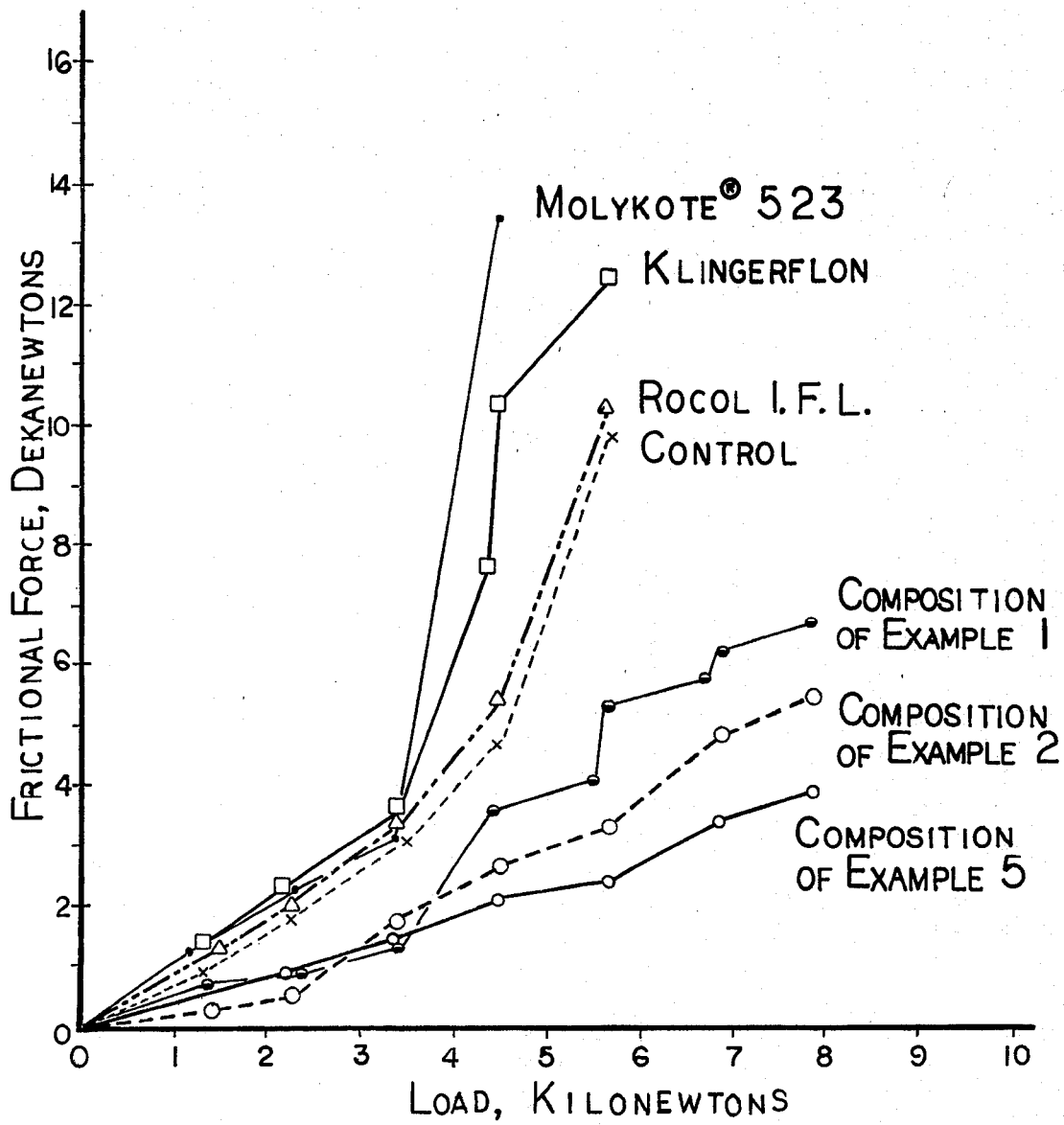

AIR- AND/OR OVEN-DRYING LUBRICANT PAINT COMPOSITION FOR PRODUCING DRY-FILM LUBRICANTS

BACKGROUND OF THE INVENTION

This invention relates to an air- and/or oven-drying lubricant paint composition for producing dry-film lubricants, especially for bolts and screw connections.

Structural parts of any type that are in movement relative to each other during their use must be lubricated appropriately to reduce the frictional resistance and the wear that it causes. Permanent lubrication in the form of dry-film lubricants based on solid lubricants has proven to be especially advantageous for parts that are exposed to oscillating or intermittent movements.

With regard to the theory and practice of solid lubricants, the reader is referred to Ingenieur Digest, Vol. 13, No. 12 and Vol. 14, Nos. 1 to 3, by Dr. Fritz Wunsch (Klüber Lubrication Munich KG). This publication gives a survey of the most important lubricants, their mode of action, the commercial forms in which they are available and their use.

In particular, this review describes organic lubricant paints that can contain primarily molybdenum disulfide and graphite or polytetrafluoroethylene as the solid lubricant pigment and a polyimide resin as a binder.

A similar composition is also described in Journal of the American Society of Lubrication Engineers (1967) pp. 288–294, where lubricant paints are described that contain molybdenum disulfide or antimony trioxide as solid lubricant pigments, polyimide resins as binders and N,N-dimethylacetamide or mixtures of pyrrolidone and xylene as the solvent together with an extender.

The above lubricant paints of the art for forming dry-film lubricants can be used for a wide variety of lubrication purposes; so, theoretically, they can also be used to lubricate screw connections in order to at least bring the friction conditions at the head and thread of the screw under some control, because this causes pre-stressing of the screw connections. There is generally a reduction in the coefficient of friction when a screw connection is lubricated in this way. However, in addition to the reduced coefficient of friction, screw connections lubricated in this way generally experience a number of other problems.

Thus, special thread lubricants have been developed specifically to better meet the special requirements of screw connections. In this regard, especially suitable high-performance lubricants and the special conditions prevailing in the lubrication of screw connections are discussed in the brochure, Empirical Reports, 46/1, Screws, 2/III/67, from the company Molykote. According to this report, a particular problem encountered in lubricating screw connections is that there is generally a reduction in the coefficient of friction, but there is a wide range of variation in this reduction with different carrier metals and with different surface treatment methods, and a great deal of scattering between one screw and another within the same production lot. In addition, there is also a relatively great scattering in the coefficient of friction after repeated loosening and tightening of a given screw connection.

This fact is recognized as a major problem in the industry, so there is an urgent need for providing more security for screw connections. There is also the closely related problem of the loosening of screw connections due to vibration, which exists with a wide variety of structures, and especially in the automobile industry.

A lubricant paint for forming dry-film lubricants, especially for bolt and screw connections, would be ideal (i) if it provided a reduction in the coefficient of friction to a practically uniform and relatively narrow range for a wide variety of carrier metals and surface treatment methods and within the same production lots, (ii) if it would show practically no scattering in the coefficient of friction after repeated loosening and tightening of the screw connection, and (iii) if it would nevertheless yield a screw connection that would resist loosening, especially under vibration. None of the lubricant paints known so far does justice to this ideal to any extent at all.

BRIEF SUMMARY OF THE INVENTION

It is an object of this invention to provide a new air- and/or oven-drying lubricant paint for forming dry-film lubricants that will yield appropriate reductions in the various coefficients of friction of different carrier metals to a relatively narrow and uniform coefficient of friction range and thus practically the same range, so it can almost be regarded as a coefficient of friction equalizer, while at the same time assuring that the possibility of such screw connections loosening due to vibration is practially ruled out. Such a lubricant paint for forming dry-film lubricants that acts as a coefficient of friction equalizer to a certain extent should therefore be especially advantageous for use with screws and screw connections.

The above object has now been realized according to this invention by an air- and/or oven-drying lubricant paint composition for forming dry-film lubricants, characterized by the fact that it comprises a resin binder, an optionally modified polyalkylene wax and an organic solvent for the binder.

BRIEF DESCRIPTION OF THE DRAWING

The sole drawing is a graph relating the frictional force and the applied load as measured with a FALEX ® testing machine, in accordance with ASTM D2670-67, for several dry-film lubricants.

DETAILED DESCRIPTION OF THE INVENTION

The present invention relates to air- and/or oven drying compositions for preparing dry-film lubricants, said compositions comprising (a) a binder selected from the group consisting of polyarimide resins, polyaramidimide resins and polyester arimide resins, (b) a solid lubricant selected from the group consisting of polyalkylene waxes and modified polyalkylene waxes and (c) an organic solvent for the binder.

Component (a) of the present lubricant paint can be any of the well-known polyarimide resins, polyaramidimide resins or polyester arimide resins. These resins are polycondensation reaction products of a multicarboxyl-containing component and a diamine component or a diisocyanate component. The di-, tri- or tetra-functional carboxyl component of such a resin is normally a corresponding aromatic carboxylic acid or an aromatic carboxylic acid anhydride, whereas the diamine or diisocyanate component is usually likewise an aromatic compound. The reader is referred to Lehrbuch der Lacke and Beschichtigungen (Textbook of paints and coatings) by Dr. Hans Kittel, Vol. I, Part 2 (1973), pp. 499–503 and p. 554 for details regarding resins that are suitable in this respect. Additional information on resins of this type that can be used according to this invention may be found in Ullmans Encyklopadie der technischen Chemie, 3rd ed., supplement volume (1970), pp. 266–268.

Component (a) in the present lubricant paint is preferably a polyaramidimide resin obtained by polycondensation of trimellitic anhydride and diphenylmethane-4,4'-diisocyanate or a polyarimide resin obtained by polycondensation of pyromellitic anhydride and 4,4'-diaminodiphenyl ether or diphenylmethane-4,4'-diisocyanate.

An example of a polyaramidimide resin that is suitable for use according to this invention is the base resin of the wire enamels distributed under the brand name RHODEFTAL by Rhone-Poulenc, F-75360 Paris. According to this invention, RHODEFTAL 311 is preferred; it is a 25 wt% solution of a polyaramidimide resin based on trimellitic anhydride and diphenylmethane-4,4'-diisocyanate in a solvent mixture of a N-methylpyrrolidone and xylene (about 72 wt% N-methylpyrrolidone and about 28 wt% xylene).

An example of a preferred polyarimide resin according to this invention is the wire enamel available from DuPont, Wilmington, Del. (USA) under the name PYRE-M.L., whose base resin is a condensation product of pyromellitic anhydride and 4,4'-diaminodiphenyl ether, which is available in various resin concentrations in solvent mixtures of N-methylpyrrolidone and xylene. Of these products, one that is preferred according to this invention has a resin content of about 19.5 wt% and a solvent content of 80.5 wt%, consisting of 70 wt% N-methylpyrrolidone and about 30 wt% xylene. One such preferred wire enamel is available under the name PYRE-M.L. RC 5093. Reference ismade to U.S. Pat. No. 3,179,634 which is hereby incorporated herein by reference to show other polyarimides that are suitable in this connection.

Instead of the polyaramidimides or polyarimides mentioned individually above, it is of course also possible to use any other polyaramide resin, polyaramidimide resin or polyester arimide resin as a binder according to this invention, and reference is herewith made to the literature mentioned initially in this respect.

Component (b) that is used as the solid lubricant pigment according to this invention can consist of any known waxy polyalkylene that normally has an average molecular weight of less than 15,000, preferably less than 10,000, and may optionally also be modified in the usual way. Polyethylene waxes and polypropylene waxes with a molecular weight of less than 10,000 are preferred here, and these waxes may or may not be modified to improve their lubricating properties in the usual way. This can include polyethylene wax or polypropylene wax with a molecular weight of less than 10,000 that has been modified with polytetrafluoroethylene, polyperfluoroethylenepropylene or amide.

An especially preferred polytetrafluoroethylene modified polyethylene wax according to this invention is the product that is available under the brand name LANCO-WAX TEF 1778 from the company Langer GmbH & Co. KG, D-2863 Ritterhude, which is a sprayed polyethylene wax with a molecular weight of less than 10,000, which contains a powdered wetting agent or antistatic agent and on whose surface about 7.5 wt% polytetrafluoroethylene with a particle size of about 0.3 $\mu$m is anchored by treatment in an air jet mill. Other data on this micronized and polytetrafluoroethylene-modified polyethylene wax can be obtained from Memorandum I/395 from the above-mentioned company.

Another polyalkylene wax that is especially suitable as a solid lubricant pigment according to this invention is an amide-modified polypropylene wax that is available from the same company under the brand name LANCO-WAX 1362D; it has a molecular weight of less than 10,000 and a Shore hardness of 4 to 6. Additional information regarding such a wax can be obtained from Memorandum I/380 from the above-mentioned company.

Component (c) of the present lubricant paint composition can be any organic solvent that assures adequate dissolving of binder (a). In addition to the actual solvent for this binder, component (c) may optionally also contain the usual extenders or diluents.

The organic solvent is normally a polar solvent, preferably an amide solvent. Of these polar solvents, the following have proven to be especially advantageous: N-methylpyrrolidone, acetonitrile, dimethylformamide, dimethylacetamide or dimethyl sulfoxide.

The extender that may also be present in component (c) in addition to the organic solvent is usually an aromatic hydrocarbon, such as benzene, toluene or xylene. The extender can be present only in amounts that do not endanger the required effect of the organic solvent, namely adequate dissolving of the binder (a) of the present lubricant paint. Therefore, the extender should not constitute more than 40 wt% of component (c), preferably no more than 25 wt%.

The lubricant paint compositions of this invention can further comprise the usual adjuvants, including dispersants, wetting agents, levelling agents or antistatic agents. These usual adjuvants are usually present in the lubricant paint in subordinate amount, e.g., in an amount of only up to 3 percent by weight, based on the weight of the composition. Those of average skill in the field will know of individual substances that can be used as such agents, so they need not be listed in detail.

The weight ratio in which components (a) and (b) are present in the lubricant paint composition according to this invention is not particularly critical. It is only important for the amount of binder (a) to be such that the solid lubricant pigment (b) is embedded well and an adequate lubricant effect remains and there is a sufficiently strong binding of the dry-film lubricant to the respective carrier. Therefore, the weight ratio in which components (a) and (b) are present in the lubricant paint may vary within a wide range, but should generally be between 5:1 and 1:10, preferably between about 3:1 and 1:6. The optimum weight ratio of these two components (a) and (b) for a specific purpose can be determined by one skilled in the art on the basis of simple experiments.

Similar considerations apply to the amounts of components (a) and (b) that are present in the lubricant paint according to this invention. If the lubricant paint contains too little of these components, the viscosity will be too low, leading to problems in application and to a dry-film lubricant that may not have sufficient thickness and may also have the disadvantage that drying and hardening take too much time and require too much energy. However, if components (a) and (b) are present in excessively large amounts, the viscosity of the lubricant paint will be too high, leading to problems in application and to irregular dry-film lubricants. Therefore, components (a) and (b) must be present in a balanced ratio in component (c), which serves as the solvent for binder (a) and as the diluent for the solid lubricant pigment (b) in the lubricant paint. In general, components (a) and (b) should be present in this lubricant paint in an amount of about 20 to 80 wt%, preferably in an amount of 40 to 60 wt%.

The lubricant paint composition according to this invention is a dispersion of the solid lubricant pigment (b) in a solution of the binder (a) in the organic solvent (c). It should have a viscosity in the range of 2,500 to 3,500 cP and its color ranges from light to transparent.

The lubricant paint, according to this invention, can be applied by the usual methods, e.g., by spraying, dipping, flooding, spreading or immersion centrifugation, to the parts that are to be coated, which should first be cleaned and degreased well. It is dry to the touch within 2 to 3 hours at room temperature and is ready for use within about 5 to 7 hours. The lubricant paint dries in about 1 to 3 hours at a temperature of from 130° to 150° C. The dry-film lubricant obtained after appropriate hardening should generally have a layer thickness of 3 to 15 $\mu$m, preferably 8 to 12 $\mu$m, and usually has a temperature use range of $-70°$ C. to $+200°$ C. The dry-film lubricant is light-colored to transparent, has extremely good lubricant properties, a good adhesive strength on the coated article and offers good corrosion protection, electrical insulation and good resistance to oil, fats, chemicals and solvents in general.

In its preferred use for surface treatment of nuts, bolts and screws of all types, the special properties of the present lubricant paint are especially valuable; namely, practically uniform friction values with screw connections of various materials. The resultant dry-film lubricant thus practically represents a coefficient of friction equalizer for a wide variety of materials. In addition to an extremely low coefficient of friction, the dry-film lubricant also has the additional advantage of a very high load-bearing capacity, so the use of the present lubricant paint is recommended wherever traditional lubricants fail. This lubricant paint can also be used to produce dry-film lubricants on galvanically coated surfaces. In addition, the present lubricant paint is also suitable for producing anti-wear layers on pneumatic cylinders and pistons. The lubricant paint according to this invention can therefore be used in general wherever traditional lubricants and lubricant paints have been used in the past. However, its preferred area of use, as mentioned above, is for surface treatment of nuts and bolts, as well as wherever dark-colored dry-film lubricants are not desired; wherever there are high loads, low speeds and oscillating movements; wherever seizing of moving parts is to be prevented; wherever an appropriate carrier material is to be protected from corrosion; wherever there is exposure to dust and dirt; and wherever oils and greases cannot be used, relubrication is impossible and very low friction values ae required.

The following examples are disclosed to further illustrate, but not to limit, the present invention. All parts are by weight unless stated differently.

EXAMPLE 1

To produce a lubricant paint of this invention, 10 parts of a polyaramidimide resin solution of 25 parts of a polyaramidimide resin based on trimellitic anhydride an diphenylmethane-4,4'-diisocyanate in 75 parts of a solvent mixture of 72 parts of N-methylpyrrolidone and 28 parts xylene was added gradually to 10 parts of N-methylpyrrolidone solvent in the mixing bowl of a mixer equipped with an ordinary mixing mechanism. The polyaramidimide resin solution was a product that is available under the name RHODEFTAL 311 from the company Rhone-Poulenc. The resulting solution of the polyaramidimide resin produced as described above was then mixed thoroughly with 10 parts of an amide-modified polypropylene wax that had an average molecular weight of less than 10,000, a Shore hardness of 4 to 6 and an average particle size of 4 $\mu$m, available under the brand name LANCO-WAX 1362D from Langer GmbH & Co. KG, D-2863 Ritterhude. This yielded a lubricant paint with a viscosity of about 3,000 cP and a specific gravity of about 1.035.

This lubricant paint composition was applied to the appropriate test support using an immersion centrifuge method and air-dried for six hours to yield a dry film having a thickness of about 10 $\mu$m. The treated test supports were then tested by one or more of the test procedures included below.

EXAMPLE 2

The preparation and testing described in Example 1 were repeated except that instead of the amide-modified polypropylene wax, the same amount of a polytetrafluoroethylene-modified polyethylene wax was used. This wax was a sprayed polyethylene wax having a molecular weight of less than 10,000 and an average particle size of about 2.7 $\mu$m and containing a powdered wetting agent or antistatic agent and about 7.5 parts of polytetrafluoroethylene with a particle size of about 0.3 $\mu$m mechanically anchored on its surface by treatment in an air jet mill. A polyethylene wax of this type is available under the brand name LANCO-WAX TEF 1778 from the company Langer GmbH & Co. KG, D-2863 Ritterhude.

EXAMPLE 3

The preparation and testing described in Example 1 were repeated, except that 40 parts of the polyaramidimide resin solution, 20 parts of the N-methylpyrrolidone solvent and 40 parts of the amide-modified polypropylene wax were used.

EXAMPLE 4

The preparation and testing described in Example 1 were repeated, except that 15 parts of the polyaramidimide resin solution was used with 44 parts of the N-methylpyrrolidone solvent and 40 parts of the amide-modified polypropylene wax.

EXAMPLE 5

The preparation and testing described in Example 2 were repeated except that instead of the polyaramidimide resin solution 10 parts of a polyarimide resin solution of 25 parts of a resin of pyromellitic anhydride and 4,4'-diaminodiphenyl ether in 75 parts of a solvent mixture of 72 parts of N-methylpyrrolidone and 28 parts of xylene was used. This polyarimide resin solution is available under the brand name PYRE-M.L. RC5093 from DuPont.

COMPARATIVE EXAMPLES

The following compositions were also tested by one or more of the test procedures included below and the results are summarized in the tables and drawing.

Molykote 523—a spray lubricant paint from Dow Corning GmbH, D-8000 Munich (Brochure No. 71-166-03, Issue 1, 25/IV/71).

Klingerflon—a lubricant spray parting compound from R. Klinger GmbH, D-627 Idstein (Brochure KUF-1963(05)-7000, No. 22, KF 118).

Rocol I.F.L.—a lubricant spray parting compound based on a fluorocarbon telomer from Rocol Ltd., Swillington, England.

Control—Same as the composition of Example 1 except the 10 parts of amide-modified polypropylene wax was replaced with an equal volume of polytetrafluoroethylene from Liquid Nitrogen Products Corporation as TL126TFE (Brochure No. PD/PL-308-1068).

The following test procedures were used to evaluate the lubricant paint compositions of this invention.

TESTING DRY-FILM LUBRICANTS ON THE LFW-1 FRICTION AND WEAR TESTING MACHINE

Under a revolving load of 680 N at 72 rpm, the LFW-1 machine tests the frictional force and the lifetime (revolutions until the coefficient of friction reaches a value of 0.1) of the dry film lubricant.

The dry-film lubricants were used in amounts to yield films about 10 μm thick in each case and were dried or hardened according to the manufacturer's instructions.

The results obtained in these tests are shown in Table I, indicating that the lubricant paint according to this invention is far superior to the corresponding commercial products or other products that contain polytetrafluoroethylene with regard to both the lifetime and the frictional force of the dry-film lubricants.

TABLE I

| Lubricant Composition | Lifetime, kilorevolutions | Frictional Force, newtons |
|---|---|---|
| Example 1 | 150 | 25 to 35 |
| Example 2 | 290 | 20 to 30 |
| Example 5 | 390 | 25 to 35 |
| Molykote 523 | 25 | 55 to 60 |
| Rocol I.F.L. | 25 | 69 to 71 |
| Klingerflon | 30 | 70 to 80 |
| Control | 30 | 55 to 60 |

TESTING ON THE FALEX TESTING MACHINE TO DETERMINE LOAD-BEARING CAPACITY

These tests were performed in accordance with ASTM D2670-67, and the machine required to perform these tests is described in the 1979 Annual Book of ASTM Standards, Part 24, along with the test procedure itself.

The same substances are used for these tests as for the tests on the LFW-1 testing machine.

The test results are shown in the sole drawing indicating that the dry-film lubricants produced from the lubricant paint compositions according to this invention have a considerably higher load-bearing capacity than the corresponding dry-film lubricants from the comparative products.

DETERMINING THE ADHESION OF DRY-FILM LUBRICANTS ON VARIOUS CARRIERS

These tests were performed in accordance with the procedure specified in DIN 53,151, which is also described in Standards for Paints and Similar Coating Materials, DIN Pocketbook 30.

This test shows that the dry-film lubricants produced from the lubricant paint according to this invention adhere very well to a variety of surfaces, even to smooth and metallized surfaces.

TESTING CORROSION PROTECTION PROVIDED BY THE DRY-FILM LUBRICANTS PRODUCED FROM THE LUBRICANT PAINTS ACCORDING TO THIS INVENTION

These tests are performed according to the method specified in DIN 50,021, which is also described in Standards for Paints and Similar Coating Materials, DIN Pocketbook 30.

To perform these tests, dry-film lubricants were applied to bare steel in a layer thickness of about 12 μm and then subjected to a salt spray test.

The results obtained here show that the dry-film lubricants thus tested impart a corrosion protection to the carrier material lasting at least 100 hours.

TESTING SCREWS AND BOLTS TO DETERMINE THEIR FRICTION VALUES ON THE BOLT TESTING STAND FROM THE COMPANY BERGNER, PFAFF MODEL

The bolt testing stand used for these tests is described in a reprint from Draht-Fachzeitschrift, No. 10/75. The bolts were automatically tightened and the coefficient of friction was measured electronically. Thread friction and head friction were measured separately, but the resulting coefficient of friction was then given as a total coefficient of friction.

The results obtained in these tests are shown in Table II which indicates that the present lubricant paint is particularly suitable for lubricating screws and bolts and screw connections, because it causes a great reduction in the coefficient of friction for a wide variety of materials, and practically has the effect of equalizing the coefficients of friction.

The lubricant paints were also tested in the Bergner bolt test, again using blackened steel bolts, hot galvanized steel bolts and V2A steel bolts of the size M10, while working at a prestressing force of 20 kN. The various types of bolts were tightened five times each, and the corresponding coefficient of friction was determined. Each value represents the results of three tests. The results are shown in Table III.

These test results show that when used on the different bolts listed above, the lubricant paint according to this invention yields dry-film lubricants that have an extremely low coefficient of friction which is practically the same with materials that differ greatly, unlike the known dry-film lubricants.

TABLE II

| Bolt and Nut | | Coefficient of Friction | | | | |
|---|---|---|---|---|---|---|
| | | Mineral Oil | | | Composition of Example 1 | |
| Treated Bolt | Untreated Nut | Initial | After 5 tightenings | Scattering from bolt to bolt | Initial | After 5 tightenings |
| Blackened steel | Blackened steel | 0.13 | 0.12–0.14 | 0.11–0.15 | 0.06 | 0.055–0.065 |
| Hot-galvanized steel | Hot-galvanized steel | 0.16 | 0.14–0.18 | 0.15–0.19 | 0.06 | 0.005–0.065 |

TABLE II-continued

| Bolt and Nut | | Coefficient of Friction | | | | |
|---|---|---|---|---|---|---|
| | | Mineral Oil | | | Composition of Example 1 | |
| Treated Bolt | Untreated Nut | Initial | After 5 tightenings | Scattering from bolt to bolt | Initial | After 5 tightenings |
| V2A steel | V2A steel | 0.24 | 0.17–0.30 | 0.16–0.32 | 0.06 | 0.055–0.065 |
| V2A steel | Aluminum | Seized | Seized | Seized | 0.06 | 0.055–0.065 |
| Titanium[1] | V2A steel | 0.12 | 0.11–0.13 | 0.10–0.14 | 0.06 | 0.05–0.07 |

[1] Treated with a $MoS_2$—based lubricant paint (Molykote ® 88 from Dow Corning GmbH).

TABLE III

| Lubricant Composition | Coefficient of Friction | | |
|---|---|---|---|
| | Blackened Steel | V2A Steel | Hot Galvanized Steel |
| Example 1 | 0.055–0.08 | 0.06–0.08 | 0.005–0.09 |
| Example 2 | 0.03–0.05 | 0.04–0.06 | 0.035–0.06 |
| Example 5 | 0.04–0.05 | 0.05–0.06 | 0.04–0.06 |
| Molykote 523 | 0.08–0.12 | 0.06–0.09 | 0.095–0.125 |
| Rocol I.F.L. | 0.10–0.135 | 0.07–0.09 | 0.09–0.14 |
| Klingerflon | 0.10–0.11 | 0.065–0.08 | 0.08–0.16 |
| Control | 0.07–0.10 | 0.085–0.12 | 0.09–0.17 |

TESTING COUNTERSUNK PHILLIPS WOOD SCREWS DRIVEN IN A HARD BEECH BOARD BY MEANS OF A TORQUE SCREW DRIVER

For these tests, an ordinary torque screw driver was used, working with various pretreated countersunk Phillips wood screws 35×3 mm in size. The screws were driven into a hard beechwood board 3 cm thick by means of a torque screw driver. The torque on the torque screw driver was read at a screw-in depth of 1 cm and just before the head of the Phillips wood screw came in contact with the countersunk surface of the wood.

The results obtained in these tests are shown in Table IV, indicating that the lubricant paints according to this invention are excellently suited for treating screws. A reduction of about 50% in the torque required to drive the screws was found in comparison with the untreated and bare galvanized countersunk Phillips wood screws. There was practically no stripping or deformation of the head. The countersunk Phillips wood screws coated with polytetrafluoroethylene yielded torque values that were approximately equal to those of screws coated with the present lubricant paint, but they have the disadvantage that the coating must absolutely be applied by baking, and furthermore, the polytetrafluoroethylene sprays used to apply the coating are not very inexpensive.

TABLE IV

| Wood Screws | Torque, cm/N |
|---|---|
| Untreated and bare galvanized wood screws | 120–280 |
| Wood screws coated with polytetrafluoroethylene and baked at 250° C. | 50–150 |
| Wood screws coated with Example 1 composition and air-dried | 50–120 |

TESTING ON THE VIBRATION TESTING STAND TO DETERMINE THE SCREW SECURITY

The 8-8 bolts and nuts that are customary in automobile construction were used for these tests. The nuts were secured with nylon rings so as to be self-blocking. Parallel tests were also performed using the same nuts and bolts, but the nuts and bolts were first provided with a coating of dry-film lubricant using the lubricant paint according to Example 1.

The equipment used for this test consisted of a frame with two slide rails that had slits 38.8 mm long and 19.05 mm wide. The frame was moved by a cam along a path of 22.8 mm. The test bolts were vibrated at a frequency of 1310 cycles/minute. The test piece itself consists of a bolt fastened in a socket by means of washers. The individual tests were performed at room temperature. The torque was measured with a torque wrench that had an accuracy of ±5%. The prestressing force was checked every 500 cycles. After 10,000 cycles, the prestressing force was measured every 5000 cycles. The testing procedure was concluded when all the nuts had loosened by one turn.

In the above tests it was found that after 100,000 cycles, 55% of the nuts had loosened from the bolts secured with self-blocking nylon rings, but only 15% of the bolts treated according to this invention had loosened under conditions that were otherwise the same. Such a positive result could not be achieved with any other lubricant in the past.

That which is claimed is:

1. An air- and/or oven-drying lubricant paint composition for preparing dry-film lubricants, said composition comprising
   (a) a binder selected from the group consisting of polyarimide resins and polyaramidimide resins,
   (b) a solid lubricant selected from the group consisting of polyalkylene waxes and modified polyalkylene waxes, and
   (c) an organic solvent for the binder, optionally containing an extender.

2. A composition according to claim 1 wherein the binder is a polyaramidimide resin obtained by the polycondensation of trimellitic anhydride with diphenylmethane-4,4'-diisocyanate.

3. A composition according to claim 1 wherein the binder is a polyarimide resin obtained by the polycondensation of pyromellitic anhydride with 4,4'-diaminodiphenyl ether or with diphenylmethane-4,4'-diisocyanate.

4. A composition according to claim 1 wherein the solid lubricant is a polyethylene wax or a polypropylene wax.

5. A composition according to claim 1 wherein the solid lubricant is a modified polyethylene wax or a modified polypropylene wax.

6. A composition according to claim 5 wherein the solid lubricant is a polytetrafluoroethylene-modified polyethylene or polypropylene wax or a polyperfluoroethylenepropylene-modified polyethylene or polypropylene wax.

7. A composition according to claim 5 wherein the solid lubricant is an amide-modified polyethylene or polypropylene wax.

8. A composition according to claim 1 wherein the organic solvent is a polar organic solvent.

9. A composition according to claim 8 wherein the polar organic solvent is an amide.

10. A composition according to claim 8 wherein the polar organic solvent is selected from the group consisting of N-methylpyrrolidone, acetonitrile, dimethylformamide, dimethylacetamide and dimethylsulfoxide.

11. A composition according to claim 1 wherein the organic solvent contains an extender.

12. A composition according to claim 11 wherein the extender is an aromatic extender.

13. A composition according to claim 12 wherein the extender is selected from the group consisting of benzene, toluene and xylene.

14. A composition according to claim 1 further comprising an adjuvant selected from the group consisting of wetting agents, leveling agents, dispersing agents and antistatic agents.

15. A composition according to claim 14 wherein the adjuvant is present in an amount of up to 3 percent by weight, based on the weight of the composition.

16. A composition according to claims 1, 2, 3, 4, 5, 6, 7, 8, 9, 10, 11, 12, 13, 14 or 15 wherein the weight ratio of the binder to the solid lubricant has a value of from 5/1 to 1/10.

17. A composition according to claims 1, 2, 3, 4, 5, 6, 7, 8, 9, 10, 11, 12, 13, 14 or 15 wherein the binder an solid lubricant together comprise from 20 to 80 percent by weight of the composition.

* * * * *